(12) United States Patent
Bendel et al.

(10) Patent No.: US 11,273,788 B2
(45) Date of Patent: Mar. 15, 2022

(54) GAS GENERATOR, AIRBAG MODULE, VEHICLE SAFETY SYSTEM AND METHOD FOR PURIFYING A PYROTECHNICALLY PRODUCED GAS

(71) Applicant: TRW Airbag Systems GmbH, Aschau a. Inn (DE)

(72) Inventors: Elmar Bendel, Traunstein (DE); Anja Esau, Mühldorf am Inn (DE); Detlef Last, Mühldorf am Inn (DE); Christian Jung, Mühldorf am Inn (DE); Ning Wei, Augsburg (DE)

(73) Assignee: TRW AIRBAG SYSTEMS GMBH, Aschau am Inn (DE)

( * ) Notice: Subject to any disclaimer, the term of this patent is extended or adjusted under 35 U.S.C. 154(b) by 13 days.

(21) Appl. No.: 16/607,372

(22) PCT Filed: Apr. 23, 2018

(86) PCT No.: PCT/EP2018/060258
§ 371 (c)(1),
(2) Date: Oct. 23, 2019

(87) PCT Pub. No.: WO2018/197369
PCT Pub. Date: Nov. 1, 2018

(65) Prior Publication Data
US 2020/0139926 A1    May 7, 2020

(30) Foreign Application Priority Data

Apr. 25, 2017  (DE) .......................... 102017108798.2

(51) Int. Cl.
*B60R 21/264*    (2006.01)
*B01D 45/06*     (2006.01)
*B60R 21/26*     (2011.01)

(52) U.S. Cl.
CPC .......... *B60R 21/2646* (2013.01); *B01D 45/06* (2013.01); *B60R 2021/26011* (2013.01);
(Continued)

(58) Field of Classification Search
CPC .... B60D 45/06; B01D 45/16; B60R 21/2646; B60R 2021/26011; B60R 2021/2648; B60R 2021/26076
See application file for complete search history.

(56) References Cited

U.S. PATENT DOCUMENTS 3,633,343 A * 1/1972 Mark .................... F01N 3/0842
96/118
5,100,171 A   3/1992 Faigle et al.
(Continued)

FOREIGN PATENT DOCUMENTS

CN  206344786  7/2017
DE  2252741    5/1973
(Continued)

OTHER PUBLICATIONS

Bierwirth, Gas Generator, In Particular For A Vehicle Safety Device, The Gas Bag Module, The Vehicle Safety System And Method For The Production And For Operating A Gas Generator, Feb. 2, 2017, EPO, DE 102015009705 A1, Machine Translation of Description (Year: 2017).*
Sato, Inflator Filter, Sep. 3, 2009, EPO, JP 2009196447 A, Machine Translation of Description (Year: 2009).*

*Primary Examiner* — Paul N Dickson
*Assistant Examiner* — Matthew D Lee
(74) *Attorney, Agent, or Firm* — Tarolli, Sundheim, Covell & Tummino LLP

(57) ABSTRACT

The invention relates to a gas generator (10), particularly a pyrotechnical tube gas generator, with an axial longitudinal direction (L), comprising an ignition unit (20), a combustion chamber (30) axially mounted downstream from the ignition
(Continued)

unit (20) and comprising a combustion chamber bottom (35) forming a combustion chamber outlet (36), and a filter chamber (70) that is axially mounted downstream of the combustion chamber (30). According to the invention, at least one guiding sleeve (50) and a front-side baffle plate (80) are formed in the filter chamber, a first end (51) of the guiding sleeve (50), on the side of the combustion chamber, being axially mounted downstream from the combustion chamber bottom (35), and a second end (53) of the guiding sleeve (50) being associated with the baffle plate (80), a first deflection section being formed on the baffle plate (80) and the guiding sleeve (50) which allows a gas flow to an outer side of the guiding sleeve (50) into an annular first discharge chamber (75).

15 Claims, 8 Drawing Sheets

(52) U.S. Cl.
CPC ............... *B60R 2021/26064* (2013.01); *B60R 2021/26076* (2013.01)

(56) References Cited

U.S. PATENT DOCUMENTS

| | | | |
|---|---|---|---|
| 5,184,846 A * | 2/1993 | Goetz | B60R 21/272 |
| | | | 280/736 |
| 7,073,820 B2 * | 7/2006 | McCormick | B60R 21/264 |
| | | | 280/736 |
| 8,702,125 B1 * | 4/2014 | Smith | B60R 21/2644 |
| | | | 280/740 |
| 2005/0134031 A1 | 6/2005 | McCormick | |
| 2007/0001438 A1 | 1/2007 | Patterson et al. | |
| 2017/0197242 A1 * | 7/2017 | Kikuchi | B21F 27/18 |

FOREIGN PATENT DOCUMENTS

| | | | | |
|---|---|---|---|---|
| DE | 2330194 | | 12/1974 | |
| DE | 9010853.1 | | 10/1990 | |
| DE | 102015009705 A1 * | | 2/2017 | ............ B60R 21/26 |
| JP | H0826064 | | 1/1996 | |
| JP | 2009196447 A * | | 9/2009 | |
| JP | 2009262722 | | 11/2009 | |
| WO | 9734784 | | 9/1997 | |
| WO | WO-2007005824 A2 * | | 1/2007 | ............ B60R 21/26 |

* cited by examiner

GAS GENERATOR, AIRBAG MODULE, VEHICLE SAFETY SYSTEM AND METHOD FOR PURIFYING A PYROTECHNICALLY PRODUCED GAS

RELATED APPLICATIONS

This application corresponds to PCT/EP2018/060258, filed Apr. 23, 2018, which claims the benefit of German Application No. 10 2017 108 798.2, filed Apr. 25, 2017, the subject matter of which are incorporated herein by reference in their entirety.

BACKGROUND

The invention relates to a gas generator, particularly a pyrotechnical tube gas generator with an axial longitudinal direction, comprising an ignition unit, a combustion chamber mounted axially downstream of the ignition unit and comprising a combustion chamber bottom forming a combustion chamber outlet, and a filter chamber that is mounted axially downstream of the combustion chamber. Further, the invention relates to an airbag module and a vehicle safety system. In addition, the invention also relates to a method for purifying a pyrotechnically produced gas.

In gas generators for vehicle safety systems, when converting or combusting pyrotechnical propellants, hot gases are formed which are cooled in the gas generators usually by flowing through wire meshes or wire fabrics or ribbon laps or expanded metal layers. In addition, by the afore-mentioned components slag residues or solids that are forming during combustion are filtered and separated from the hot gases. Due to the high flow rates of the hot gases inside a gas generator, the separating rates for solids are extremely low, however. Moreover, the gas temperature is rapidly lowered, especially by the high mass of the afore-mentioned components (wire fabrics, wire meshes etc.), thus causing the combustion reactions in the combustion chamber and, resp., in the gas chamber to be deteriorated. This could negatively affect gas values of the hot gases which should not exceed particular concentrations.

It is the object of the present invention to state a developed gas generator comprising a filter which overcomes at least one of the afore-mentioned drawbacks.

Moreover, it is intended to state a developed airbag module and a developed vehicle safety system. The object further consists in providing a developed method for purifying a pyrotechnically produced gas.

SUMMARY

The gas generator according to the invention relates especially to a gas generator for a vehicle safety system, especially for an airbag system. In particular, the gas generator according to the invention relates to a pyrotechnical tube gas generator. The term tube gas generator especially means in this context that the outer casing of the gas generator is tube-shaped, with the length of the tube being larger than the diameter of the tube.

The gas generator comprises an ignition unit, a combustion chamber mounted axially downstream of the ignition unit and comprising a combustion chamber bottom forming a combustion chamber outlet, and a filter chamber mounted axially downstream of the combustion chamber. In addition, the gas generator has a central longitudinal axis and an axial longitudinal direction in parallel thereto which is directed starting from the ignition unit toward the filter chamber. The ignition unit, the combustion chamber, the combustion chamber bottom and the filter chamber thus may be arranged, in said order, in the direction of the axial longitudinal direction of the gas generator, while advantageously being orientated coaxially relative to one another.

In accordance with the invention, in the filter chamber at least one guiding sleeve and a baffle plate are configured, wherein a first combustion chamber-side end of the guiding sleeve is mounted axially downstream of the combustion chamber bottom and a second end of the guiding sleeve is associated with the baffle plate, with a first deflection section that allows a gas flow to an outer side of the guiding sleeve into an annular discharge chamber being formed at the baffle plate and the guiding sleeve.

The gas generator substantially comprises at least three component groups, said component groups being an ignition unit, a combustion chamber and a filter chamber. The combustion chamber is formed between the ignition unit and the filter chamber. Due to a combustion chamber outlet, a fluid communication between the combustion chamber and the filter chamber is established. The combustion chamber outlet is formed by a combustion chamber bottom or, resp., in the combustion chamber bottom in the form of an opening or a breakthrough. Accordingly, the combustion chamber bottom may be closed in the area of the combustion chamber outlet before activation of the gas generator, for example by so-called tamping which may be in the form of a metal foil made from aluminum, steel or copper. The combustion chamber bottom may be a plate or a plate-shaped element.

In the filter chamber mounted axially downstream of the combustion chamber at least one guiding sleeve and at least one baffle plate are formed. An element mounted axially downstream is understood to be a portion or a subassembly following along the axial longitudinal direction of the gas generator starting from the ignition unit in the direction of the filter chamber. The elements arranged downstream relative to each other are arranged to be functionally successive relative to each other. I.e. the elements or components in the direction of flow of the gas produced or to be produced upon activation of the gas generator are arranged or formed successively.

Direction of flow in this context is understood to be the direction of the path along which the gas or the gas to be produced by burning off pyrotechnics flows inside the gas generator from the activation of the gas generator to the gas leaving, viz. flowing out of the gas generator. Possible diffuse flows/partial flows or turbulences can be neglected in this context; i.e. the direction of flow is a main direction of flow of the gas along which the major portion of a gas flow or, resp., a partial gas flow which can be branched off is flowing.

A first combustion chamber-side end of the guiding sleeve is mounted axially downstream of the combustion chamber bottom. The first combustion chamber-side end of the guiding sleeve may directly contact the combustion chamber bottom, i.e. can rest on the latter, wherein it is also imaginable, however, that between the guiding sleeve and the combustion chamber bottom there are positioned another one or more further components such as e.g. a damping element. The guiding sleeve thus may rest on the combustion chamber bottom both directly and indirectly.

The guiding sleeve further includes a second end associated with the baffle plate. The second end of the guiding sleeve may be advantageously aligned and, resp., arranged in the direction of the baffle plate, preferably of the front-side supported baffle plate.

In the activated state of the gas generator, the guiding sleeve guides gas that is adapted to flow or is flowing into the filter chamber to the baffle plate. Preferably, the entire gas flowing into the filter chamber is guided to the baffle plate.

At the baffle plate and the guiding sleeve, a first deflection section is formed which allows gas flow to an outer side of the guiding sleeve into an annular first discharge chamber.

Hence, after being introduced into the filter chamber, the gas can be guided in the form of a gas flow at first in the inner area of the guiding sleeve in the axial longitudinal direction toward the baffle plate so as to be deflected at or by the first deflection section between the baffle plate and the second end of the guiding sleeve into the annular first discharge chamber. While being deflected, the gas flows from the inner area of the guiding sleeve through the first deflection section into an outer area of the guiding sleeve, viz. from an inner face of the guiding sleeve around the second end of the guiding sleeve to the outer side of the guiding sleeve.

Accordingly, the first deflection section may cause an inversion of the flow direction of the gas (substantially) about 180° with respect to the inflow direction of the gas. In other words, the gas flowing into the filter chamber is substantially guided to the baffle plate so as to be deflected there in the opposite direction, i.e. in the direction opposite to the inflow direction.

Moreover, the filter chamber may include at least one further deflection section arranged downstream of the first deflection section in the flow direction which deflection section (substantially) causes deflection of the gas about 90°. A further deflection section arranged downstream in the direction of flow is understood to be such deflection section which is reached by the gas initially deflected about 180° with respect to the inflow direction following the gas being in flow. It is possible that the filter chamber has plural further deflection sections, each of which causes substantially at least a deflection of the gas about 90°.

The guiding sleeve is preferably arranged concentrically inside the filter chamber outer casing. Preferably, the guiding sleeve is longer, especially many times longer, than the diameter of the guiding sleeve.

The gas generator according to the invention is especially based on the idea that the gas flow of the gas producible or produced in the combustion chamber flows into the filter chamber and may include slag constituents, with the gas flow initially flowing into the filter chamber and substantially completely flows through the filter chamber along its axial length. Said axial flow through the filter chamber is effectuated due to the guiding sleeve. At a preferably front-side baffle plate of the filter chamber forming a first deflection section, the gas or, resp., the gas flow is deflected about 180°. Then the gas or, resp., the gas flow is deflected once again by at least one further deflection section, viz. about another 90°. Subsequently, the gas may arrive at the ambient area of the gas generator. The ambient area is, for example, an airbag to be filled.

The baffle plate may be a component separate, especially spaced apart from the guiding sleeve and may preferably form a portion of an outer casing of the gas generator, wherein preferably a recess, especially a blind hole, is formed in the baffle plate. In the recess, especially in the blind hole, slag may deposit advantageously by the abrupt deceleration and deflection of the gas. The recess or the blind hole thus may be a slag trap. Optionally, a filter may be positioned between the baffle plate and the guiding sleeve, wherein the filter may especially abut on an inner end area of a second sleeve which is remote from a combustion chamber-side end of the guiding sleeve. Such filter may be a filter body made from metal, especially stainless steel or carbon steel, which is preferably present as wire cloth or wire mesh. The filter may comprise one single wire or a plurality of wires, even of different diameters, wherein the filter moreover may be present as a pre-pressed body. Such filter is smaller as regards its volume and/or its mass than comparatively known filter bodies of pyrotechnic gas generators.

The advantage and, resp., the technical effect of the filter of the invention is to be seen in combination of the filter with a filtering effect of the system separate therefrom comprising the guiding sleeve and the baffle plate with the deflection section. In other words, the filter optimizes the filtering effect of the system of the guiding sleeve and the baffle plate with the deflection section as regards gas cooling and particle filtering, however without entailing the afore-mentioned drawbacks of massive, especially large and heavy, wire meshes or wire cloths as they are known in pyrotechnical gas generators. In other words, the filter of the invention may provide minor residual filtering or residual cooling in addition to the system of the guiding sleeve and the baffle plate with a deflection section so as to allow for a certain fine adjustment with respect to filtering in the gas generator of the invention without the use of a massive filter made from wire mesh or wire cloth.

Moreover, it is especially advantageous to design the guiding sleeve without any radial openings. In other words, the guiding sleeve is preferably free from radial openings. This enables the gas flow to be completely accelerated and, resp., to be aligned after entering the filter chamber, and to be accelerated until the gas flow impacts on the baffle plate. Due to the formation of a continuous sleeve wall of the guiding sleeve, no radial partial gas flows can be branched off. In another embodiment of the invention, it is possible that, starting from the combustion chamber bottom, at least the front half, especially at least the front two thirds, of the guiding sleeve is/are free from radial openings. Accordingly, radial openings may be formed in the half facing away from the combustion chamber bottom. Especially preferred, merely in the rear third of the guiding sleeve, i.e. which is facing away from the combustion chamber bottom, radial openings are formed.

The guiding sleeve is preferably configured so that the gas flow and, resp., the gas flowing into the filter chamber is directed directly to the recess, especially the blind hole. In this way, slag constituents of the gas can be deposited or separated in an especially efficient and optimized manner.

In particular in embodiments of the filter chamber having merely one single sleeve, viz. the guiding sleeve, it is possible that at least in the rear third of the guiding sleeve radial openings are formed.

For fastening the guiding sleeve in the filter chamber, especially on the combustion chamber bottom, the combustion chamber-side end of the guiding sleeve may include a fastening flange perpendicularly projecting from the sleeve wall. Preferably, the guiding sleeve is connected to the combustion chamber bottom such that in the connecting area between the combustion chamber-side end of the guiding sleeve and the combustion chamber bottom no gas can escape. Rather, the entire gas flowing into the filter chamber is guided toward the second end of the guiding sleeve.

The combustion chamber outlet may be in the form of a central opening in the combustion chamber bottom. A central opening preferably is an opening having a circular cross-section. Moreover, it is additionally or alternatively possible for the combustion chamber outlet to be configured as an array of plural, especially kidney-shaped, oblong holes. Said oblong holes are preferably arranged to be distributed around the middle of the combustion chamber bottom. Preferably, the oblong holes are located on a joint circle.

In another embodiment of the invention, in the guiding sleeve a helical swirl vane may be formed, with the helical swirl vane extending from the area of the combustion chamber outlet toward the baffle plate, preferably while contacting the latter. The helical swirl vane causes the gas flowing into the filter chamber to move in the axial direction along the surface of the swirl vane, thus enabling particles to be better separated and the gas to be more efficiently cooled. In other words, the helical swirl vane acts according to the principle of a centrifugal separator. The particles are especially separated on the inner wall of the guiding sleeve. Moreover, the helical swirl vane causes the gas to be cooled. Here, the velocity of the gas and, resp., of the gas flow is not (relevantly) decelerated, however. In other words, even with the formation of a helical swirl vane, the gas flow or the gas impacts on the preferably front-side baffle plate so that the flow direction of the gas is reversed substantially about 180° with respect to the inflow direction.

The preferably front-side baffle plate may be in the form of a bottom element of a cup-shaped or pot-shaped front element, for example. Preferably, with such configuration of the baffle plate, the sidewall of the cup-shaped or pot-shaped front element is aligned in the direction of the guiding sleeve and, resp., in the direction of the combustion chamber bottom.

In another embodiment of the invention, the baffle plate may be in the form of a front-side end portion of the gas generator casing. Accordingly, it is possible that the front-side end portion of the gas generator casing and thus the front-side end portion of the filter chamber forms part of the first deflection section. A recess, especially a blind hole, may be formed in this case in the front-side end portion of the gas generator casing and, resp., the filter chamber.

In another embodiment of the invention, the baffle plate may be a portion integrated in a second end of the guiding sleeve. Such embodiment of the invention advantageously consists of few single parts.

In another embodiment of the invention, the second end of the guiding sleeve may have an annular portion. In a first embodiment, the annular portion may be configured to be facing away from the longitudinal axis of the guiding sleeve. In other words, an annular portion projects perpendicularly from the sleeve wall of the guiding sleeve. Such configuration of an annular portion enables the second end of the guiding sleeve to be fastened to the baffle plate, for example.

In another embodiment, the annular portion may point in the direction of the longitudinal axis of the guiding sleeve. In this way, undercuts may be formed, for example, between the baffle plate and the annular portion. Undercuts of this type increase the effect of the deposition of particles of the gas flow.

In another embodiment, the first deflection section can permit gas flow back into an inner area of the guiding sleeve, in deviation from the principle described further above.

Consequently, here the gas may be guided, after being introduced to the filter chamber, initially in the inner area of the guiding sleeve in the axial longitudinal direction toward the baffle plate to be guided back at the first deflection section on the baffle plate into the inner area of the guiding sleeve again, corresponding to a re-deflection of the gas flow about 180°. The gas flow deflected in this way can only afterwards be passed on from the inner area of the guiding sleeve via another deflection portion to an outer side of the guiding sleeve, preferably into a first annular discharge chamber.

The guiding sleeve in cross-section may take the shape of a star having radially outwardly directed points. It is further possible that the guiding sleeve has a central portion of substantially circular cross-section with bulges enlarging the cross-section. Especially, three or four of said bulges may be provided. The bulges may especially have a substantially rectangular cross-section. Due to such cross-section including bulges enlarging the cross-section, a filter chamber in the form of a radial labyrinth may be configured. Accordingly, in the bulges and, resp., in the sidewalls forming the bulges plural oblong holes extending in the axial direction are formed. After the gas has rebound from the baffle plate and has been deflected substantially about 180° with respect to the inflow direction, the gas may flow off through said oblong holes. Preferably, the gas then flows along the inner surface of the filter chamber outer casing toward the combustion chamber and subsequently outwardly through openings formed in the filter chamber outer casing.

When such cross-section of the guiding sleeve is formed, thus a three-dimensional deflection about 180° to 270° is possible. Preferably, a guiding sleeve of this type is formed in a filter chamber outer casing such that discharge chambers separated from each other are formed between the enlarging bulges of the guiding sleeve. The number of the discharge chambers corresponds to the number of the enlarging bulges. The gas exiting through the (oblong) holes of the guiding sleeve thus flows into a discharge chamber formed between the bulges. In the discharge chamber the gas may expand.

When forming a guiding sleeve having the afore-described cross-section as regards enlarging bulges, it is advantageous to configure an anti-twist protection in the filter chamber. The anti-twist protection is intended to inhibit twisting of the guiding sleeve inside the outer casing of the filter chamber. It is possible, for example, to form kidney-shaped elements inhibiting twisting of the guiding sleeve inside the filter chamber outer casing at the combustion chamber-side end or at the opposite end of the filter chamber between the bulging portions of the guiding sleeve.

It is possible that the filter chamber comprises a second sleeve which is arranged substantially concentrically around the guiding sleeve. The second sleeve includes plural radial openings. Preferably, the radial openings of the second sleeve are formed in the front half facing the combustion chamber, especially in the front third facing the combustion chamber. The second sleeve may include an annular fastening flange at one end or at both ends. Moreover, it is possible that the fastening flange of the second sleeve faces to the inside or to the outside.

In addition or as an alternative, a combustion chamber-side end of the second sleeve is spaced apart from the combustion chamber bottom and from the guiding sleeve, especially the guiding sleeve being formed integrally with the combustion chamber bottom or contacting the same and/or the second sleeve being formed integrally with the baffle plate or contacting the latter.

Accordingly, it is thus possible that the combustion chamber bottom forms one single component together with the guiding sleeve and/or the baffle plate equally forms one single component together with the second sleeve. This offers the advantage of a reduction of single components for the gas generator.

The afore-described at least further deflection section may be in the form of an opening configured in the rear half, especially in the rear third, of the guiding sleeve, for example. In such case, the filter chamber preferably has no second sleeve. "Rear half" in this context is meant to be the half of the guiding sleeve which is more distant from the combustion chamber bottom and closer to the baffle plate. Moreover, it is possible that the further deflection section is formed between the combustion chamber-side end of the second sleeve and the combustion chamber bottom. In this case, the second sleeve does not contact the combustion chamber bottom, but there is given a distance between said two components which causes a gap to be formed between said components which may act as the further deflection section. In addition, the further deflection section may be in the form of a radial opening in the second sleeve or of a radial opening in a filter chamber outer casing.

In addition, it is possible that a second annular discharge chamber is formed between the second sleeve and a or, resp., the filter chamber outer casing, wherein a or, resp., the radial opening formed in the filter chamber outer casing is arranged in the axial longitudinal direction spaced apart from the combustion chamber-side end of the second sleeve and from each radial opening possibly configured in the second sleeve. This means that the gas flow, after having flown into the second discharge chamber, still has to cover a certain axial distance in the second discharge chamber, before it can leave the latter via the radial opening formed in the filter chamber outer casing in the direction of the gas generator environment. Thus, the gas flow can be further cooled and/or filtered as regards particle deposition.

When merely one guiding sleeve is formed, between the filter chamber outer casing and the guiding sleeve merely one discharge chamber is formed. Said discharge chamber may also be made from plural portions radially separated from each other. When forming a second sleeve in the filter chamber, at least two discharge chambers are formed. The second discharge chamber surrounds the first discharge chamber. The second discharge chamber, too, may be made from plural portions being radially separated from each another.

When the gas flows through or, resp., passes the discharge chamber(s) and, resp., gap areas between the sleeves and the filter chamber outer casing, the gas is preferably accelerated again and is deflected several times about 90° at a time. Accordingly, further solid particles are separated in dead areas of the gas flow, viz. in areas having a significantly reduced velocity of the gas flow, and at the sleeve walls and, resp., at the inner surface of the filter chamber outer casing. Said gap areas may be formed between the guiding sleeve and the filter chamber outer casing and, resp., between the guiding sleeve and the second sleeve or, resp., between the second sleeve and the filter chamber outer casing. Due to the high pressure prevailing in the entire filter chamber and due to the high temperatures, also values and, resp., concentrations of detrimental gases or gas compositions may be reduced.

It is another advantage that the guiding sleeve and, where appropriate, the second sleeve have a lower weight than known wire mesh filters and are more cost-efficient. Due to the lower mass, for a like can output or output of the gas generator less propellant has to be used and, resp., ignited. Thus, the length of the gas generator can be reduced.

Moreover, the dispersion of the output of the gas generator according to the invention is reduced. This is evident in measurements by means of a known measuring method for the output of gas generators (output measurement in a standardized measuring can). There the scattering with the so-called can output could be reduced as the flow cross-sections are more reproducible by small tolerances of the guiding sleeve and, where appropriate, of the second sleeve than the statistically distributed flown-through wire cross-section in a known wire mesh filter. Thus, the robustness of the system is increased in a gas generator according to the invention.

The compact arrangement of the guiding sleeve as well as of the second sleeve, where appropriate, enables said sleeves to be used in gas generators having an outer diameter of 20 mm.

It is possible that the guiding sleeve includes plural lugs or recesses which extend axially, i.e. extend in parallel to the axial longitudinal direction of the gas generator. Said axially extending lugs and, resp., recesses are preferably (evenly) distributed on the periphery of the guiding sleeve. Lugs/recesses extending axially in this way serve for detecting the position of the mounted guiding sleeve inside the outer casing of the filter chamber. The lugs and, resp., recesses can be detected due to openings formed in the filter chamber outer casing.

In the filter chamber outer casing at least two openings, especially at least two oblong holes, are formed. Here, the surface of said openings through which gas can flow is spread substantially evenly radially over the periphery of the gas generator and, resp., of the filter chamber outer casing. This serves for neutral shear behavior of the gas generator.

Another independent aspect of the invention relates to a gas generator, especially a pyrotechnic tube gas generator, having an axial longitudinal direction, which comprises an ignition unit, a combustion chamber arranged axially downstream of the ignition unit which has a combustion chamber bottom forming a combustion chamber outlet, and a filter chamber which is arranged axially downstream of the combustion chamber. The combustion chamber outlet is in the form of at least one opening in the combustion chamber bottom.

In accordance with the invention, in the filter chamber a plate labyrinth filter system including at least two plates positioned axially downstream of each other is formed. The plates are aligned substantially perpendicularly to the axial longitudinal direction of the gas generator and preferably substantially in parallel to the combustion chamber bottom. Accordingly, each of the plates has at least one through-opening, with the through-openings of two adjacent plates being arranged to be offset against each other in the radial direction.

The opening in the combustion chamber bottom may be a central opening and is preferably configured as an opening having a circular cross-section. The combustion chamber outlet is especially configured such that merely one single gas flow entering the filter chamber is formed.

The at least two plates positioned to be axially downstream of each other thus form an axial labyrinth deflection.

A plate of the plate labyrinth filter system which is first in the axial longitudinal direction of the gas generator is vane-shaped, for example. Moreover, it is possible that said first plate takes a substantially circular shape having circular segment portions laterally projecting therefrom. The gas flowing into the filter chamber thus at first impinges in the middle on the plate. Due to the portions or circular segment portions, the plate is fastened in the filter chamber.

Between the plate of the plate labyrinth filter system which is first in the axial longitudinal direction and an inside of a filter chamber outer casing, plural flow passages are formed which are radially outwardly displaced relative to the combustion chamber outlet. The flow passages are formed especially between the vane-type portions or circular segment portions of the first plate. The number of the flow passages corresponds to the number of the vane-type portions or circular segment portions.

Preferably, the central portion of the plate, especially the circular portion of the first plate has a larger diameter and, resp., a larger cross-section than the central opening of the combustion chamber bottom. The gas flowing into the filter chamber thus cannot flow directly into the flow passages, but at first impinges on the central portion or, resp., the substantially circular portion of the plate. The gas flow is consequently deflected first about at least 90°. Subsequently, the gas flows into said flow passages. The second plate of the plate labyrinth filter system may be ring-shaped. The ring causes the gas flows leaving the flow passages to first impinge on the ring portion of the second plate and to be deflected about 90° for a second time. The second deflection is substantially perpendicular to the axial longitudinal direction, in the direction of the central longitudinal axis of the gas generator.

Then, the gas flow may leave the gas generator through the radial openings formed in the filter chamber outer casing.

For all afore-mentioned embodiments of the gas generator according to the invention it is true that in the combustion chamber also a combustion chamber screen may be arranged which is mounted axially upstream, with respect to the longitudinal direction of the gas generator, of the filter chamber, the combustion chamber screen being preferably in the form of a sleeve having radial openings. Such combustion chamber screen which may also take the shape of a hollow frustum, serves for a sort of pre-filtering of the gas or gas flow inside the combustion chamber already, before the gas or the gas flow is introduced to the filter chamber. Here, it is especially possible that the components of ignition unit, combustion chamber screen, combustion chamber bottom, guiding sleeve, where necessary a second sleeve and the baffle plate, preferably in the foregoing order, are positioned along the central longitudinal axis and, resp., in the axial longitudinal direction of the gas generator, advantageously in concentric alignment.

Within the scope of an independent aspect, the invention is based on the idea to state an airbag module comprising an afore-described gas generator according to the invention, an airbag inflatable by the gas generator and a fastening means for attaching the airbag module to a vehicle. There are resulting advantages similar to those already stated in connection with the gas generator according to the invention.

Within the scope of the present invention, there is moreover described a vehicle safety system, especially for protecting a person, for example a vehicle occupant or a pedestrian, comprising an afore-described gas generator, an airbag inflatable by the latter as part of an airbag module, and an electronic control unit by means of which the gas generator can be activated when a trigger situation is given. The vehicle safety system may be a driver, passenger, side, knee or window airbag or a pedestrian protecting system such as e.g. a hood prop for a vehicle.

In connection with the vehicle safety system according to the invention, advantages similar to those given already in connection with the gas generator according to the invention are resulting.

In another aspect of the present invention, a method for purifying a pyrotechnically produced gas in a gas generator, especially a pyrotechnical tube gas generator is described, the gas generator preferably being an afore-described gas generator according to the invention. The method according to the invention comprises the following steps of:

introducing the gas, especially in the form of a gas flow, into a filter chamber along an inflow direction which is aligned especially in parallel to an axial longitudinal direction of the gas generator, deflecting parts of the gas or the gas flow at a baffle plate into a substantially opposite direction, re-deflecting parts of the gas or the gas flow into a substantially radial or tangential direction relating to the axial longitudinal direction of the gas generator.

By introducing first the gas, especially in the form of a gas flow, along an inflow direction into the filter chamber and then deflecting parts of the gas or gas flow at the baffle plate into the substantially opposite direction, by such deflection about 180° of the gas flow a first optimum slag or particle deposition out of the gas may take place, as the particles that are substantially heavier in proportion to the gas molecules are abruptly decelerated at the baffle plate and there can advantageously deposit.

The further re-deflection of portions of the gas or the gas flow according to the invention, now in the radial or tangential direction, allows additional slag or particle deposition to take place again.

Such well-targeted and guided directing and deflecting of the gas flow may enable substantially more efficient filtering and, resp., cooling of the gas flow, especially with respect to material costs, weight and construction space. This is not possible in known filter components, e.g. wire wraps or wire meshes, as with the latter said components are flown past or through in a completely diffuse and locally extremely different manner.

It is further noted concerning the term of "deflecting parts of the gas or the gas flow" used here that this is intended to clarify that in general in a gas generator of the present type a gas flow or the entire gas flow can be deflected or guided into one single well-defined direction in rare cases only. Rather, in practice, there will almost always be poorly developed partial branch-offs of the gas branching off a main gas flow or, resp., turbulences or discontinuities with respect to the main gas flow.

In addition to the afore-mentioned method, it is possible that one or more of the following steps are carried out additionally following the afore-mentioned method:

pre-filtering the gas before introducing it to the filter chamber, especially by means of a combustion chamber screen, preferably in such way that the gas leaves the combustion chamber screen in the inflow direction. This offers the advantage that a first particle or slag deposition, especially such having coarse or large grain size, is carried out already in the combustion chamber to load the filter chamber with fewer substances to be filtered.

re-deflecting parts of the gas in and/or against the inflow direction. Said re-deflection again allows particle and slag parts to be deposited due to their mass or, resp., inertia at appropriate locations in the ambient area of the deflection, such as e.g. at the guiding sleeve or the second sleeve.

deflecting parts of the gas from the inflow direction and/or the opposite direction into a radially outwardly directed direction and outflow through openings in a filter chamber outer casing.

deflecting parts of the gas substantially in the circumferential direction of the gas generator simultaneously with or between a deflection of the gas into or from the inflow direction or the direction opposed thereto. This step may be carried out substantially simultaneously or immediately following one of the afore-mentioned steps which comprise deflection of parts of the gas. Thus, so-to-speak a three-dimensional deflection of the gas flow is enabled which in total may comprise axial, radial and tangential directional components. Here it is beneficial that the gas and the gas flow, resp., can be retained or guided even longer, in time as well as relating to a distance to be covered by the gas, in the gas generator, especially in a relatively small space of the gas generator, in order to achieve desired cooling and filtering of the gas in an optimum and cost-saving manner.

DRAWINGS

Hereinafter, the invention will be illustrated in detail by way of example embodiments with reference to the attached schematic drawings, wherein.

In the following, like reference numerals will be used for like and equally acting components and elements.

DESCRIPTION

Figure 1:
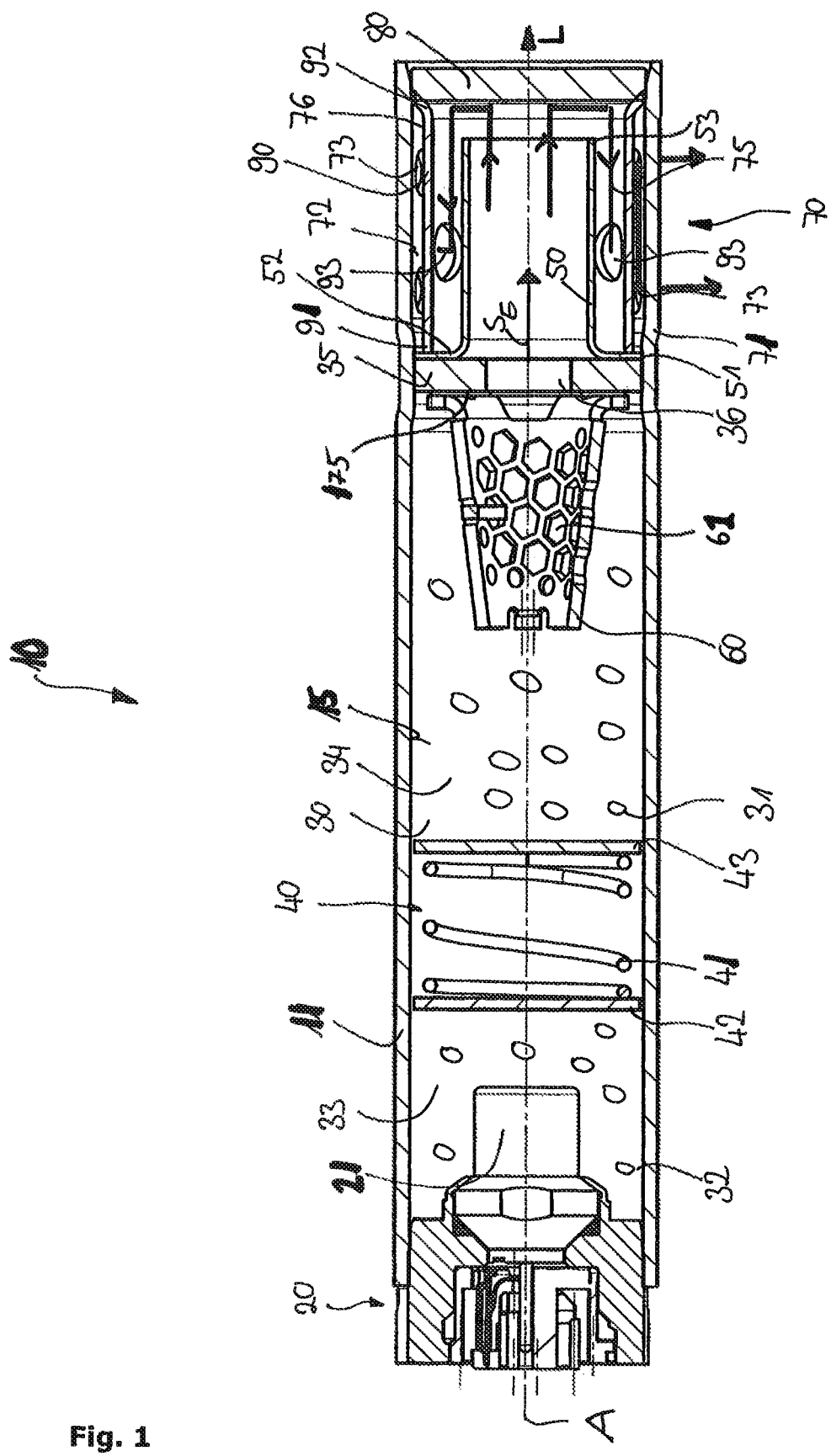
FIG. 1 shows a longitudinal sectional view across a gas generator according to the invention as set forth in a first example embodiment.

FIG. 1 illustrates a gas generator 10 in the form of an elongate tube gas generator. The outer casing 11 has a total length which is more than 4 times, especially more than 8 times, the outer diameter. Concretely speaking, the outer diameter of the outer casing (11) may be 20 mm and the total length of the outer casing (11) may be 80 mm to 160 mm. At the shown left end of the gas generator 10 an ignition unit 20 including an igniter 21 is formed. The ignition unit 20 may be a prefabricated self-contained unit. The gas generator 10 has a central longitudinal axis A and an axial longitudinal direction L parallel thereto. The axial longitudinal direction L is to be understood starting from the ignition unit toward the filter chamber and is marked by a respective arrow symbol, here in congruent position with the central longitudinal axis A.

Axially downstream of the ignition unit 20, the combustion chamber 30 is formed. In the combustion chamber 30 a pyrotechnical solid propellant bed 31 as well as ignition mixture 32 are provided. Both the solid propellant bed 31 and the ignition mixture 32 are shown merely schematically. The solid propellant bed 31 consists of a filling of individual propellant pellets, but it may as well be in the form of a monolithic molded body or in the form of lined-up disks or rings. The ignition mixture 32 equally consists of a filling of individual pyrotechnical molded bodies. The shown gaps between the individual propellant pellets or, resp., the pyrotechnical molded bodies are not that large in a realized gas generator 10.

The ignition mixture 32 is arranged in a first section 33 of the combustion chamber 30. The solid propellant bed 31, on the other hand, is located in a second section 34 of the combustion chamber 30. The first section 33 of the combustion chamber 30 reaches from the ignition unit 20 to a filler element 40. The second section 34 of the combustion chamber 30 is understood to be a successive section of the combustion chamber 30 formed between the filler element 40 and the combustion chamber bottom 35.

Between the ignition mixture 32 and the solid propellant bed 31 the filler element 40 is movably arranged. The filler element 40 is not connected to the inner face 15 of the outer casing 11. It is possible for the filler element 40 to be adjacent at least in portions to the inner face 15 of the outer casing 11. However, the filler element 40 is not fixed to the inner face 15 of the outer casing 11.

In FIG. 1, the gas generator 10 according to the invention is shown in an idle condition, i.e. a non-activated condition. The igniter 21 thus has not yet been ignited. The filler element 40 is arranged, in the idle condition of the gas generator 10, between the ignition mixture 32 and the solid propellant bed 31 so that the filler element 40 fixes the ignition mixture 32 and the solid propellant bed 31 in their positions. The filler element 40 compensates for fill tolerances during manufacture of the gas generator 10, especially in pyrotechnical filling.

The filler element 40 is formed to be resilient and has plural components. In the shown example, the filler element 40 comprises a spring 41. The spring 41 is a coil spring and has front-side terminal elements 42 and 43. The shown terminal elements 42 and 43 are disk-shaped and include openings so that, in the operating case of the gas generator 10, gas can flow through the filler element 40.

The combustion chamber outlet 36 of the combustion chamber 30 is formed by the combustion chamber bottom 35 and the opening formed therein. The opening is formed centrally and has a circular cross-section. Ahead of the combustion chamber bottom 35 or resting on the combustion chamber bottom 35, respectively, a combustion chamber screen 60 is configured. The combustion chamber screen 60 is in the form of a cone or a hollow frustum and has plural combustion chamber screen openings in the axial and radial directions through which gas may flow. Large particles of the solid propellant bed 31 are withheld due to the conical combustion chamber screen 60 and thus do not enter into the filter chamber 70 through the opening 36. Between the combustion chamber screen 60 and the combustion chamber bottom 35 a tamping 175 is fixed, preferably adhesively bonded, to the combustion chamber bottom 35. The tamping 175 thus closes the opening formed in the combustion chamber bottom 35 in the idle condition of the gas generator 10 and is in the form of a metal foil made from aluminum, steel or copper. After activating the gas generator 10, the tamping 175 is opened and, resp., destroyed due to the pressure formed in the combustion chamber 30 by burn-off of the solid propellant bed 31 and thus releases the opening in the combustion chamber bottom 35 for gas flow.

In the filter chamber 70, a guiding sleeve 50 as well as a baffle plate 80 are formed. The baffle plate 80 is a front-side baffle plate and, in the present example embodiment, closes the filter chamber 70. The baffle plate 80 at the same time also constitutes the front-side end portion of the generator casing 11. The combustion chamber-side end 51 of the guiding sleeve 50 rests directly on the combustion chamber bottom 35 in the shown example. For this purpose, the combustion chamber-side end 51 includes an annular fastening flange 52. Due to the guiding sleeve 50, the gas flowing into the filter chamber 70 is completely guided to the baffle plate 80. The baffle plate 80 forms a first deflection section causing a reversal of the flow direction of the gas substantially about 180° relative to the inflow direction $S_E$ of the gas. The guiding sleeve 50 has no radial openings so that no partial flows of the inflowing gas may escape from radial openings of the guiding sleeve 50.

The filter chamber 70 further comprises a second sleeve 90 having a combustion chamber-side end 91 and an end face 92. At the combustion chamber-side end 91 the second sleeve 90 rests on the fastening flange 52 of the guiding sleeve 50. At the front face 92 the second sleeve 90 is bent slightly outwardly and is connected to the baffle plate 80. The second sleeve 90 has plural sleeve openings 93. Said sleeve openings 93 form further deflection sections arranged downstream in the flow direction of the gas. The further deflection sections substantially cause further deflection of the gas about 90°. The flow direction of the gas starting from the inflow direction $S_E$ is shown by bold arrows. For better illustration of the portions and elements of the sleeves 50 and 90, the gas flow is shown merely in the lower half of the filter chamber 70. In fact, the gas also flows into the upper half of the filter chamber 70 and outwardly from those filter chamber openings 73. For the sake of completeness, it is noted that a gas flow and thus the afore-described illustration of the gas flows (see illustration by arrows) will only have an effect, of course, when or after the gas generator has been activated.

The guiding sleeve 50 is arranged substantially concentrically in the second sleeve 90. Between the second sleeve 90 and the guiding sleeve 50, a first annular discharge chamber 75 is formed. Between the second sleeve 90 and the filter chamber outer casing 71 a second, equally substantially annular, discharge chamber 76 is formed.

In FIG. 1, the interior of the filter chamber 70 is formed substantially of the two sleeves 50 and 90 positioned inside each other, the guiding sleeve 50 being free from radial openings. The gas flow is thus completely accelerated after entering the filter chamber 70 so that the gas flow impinges on the baffle plate 80. Due to the differently formed discharge chambers 75 and 76, the gas is accelerated again between the guiding sleeve 50 and the second sleeve 90 as well as between the second sleeve 90 and the filter chamber outer casing 71 and is deflected several times about 90°. Accordingly, solid particles or slag particles, resp., of the gas flow are separated in dead zones of the flow and at the walls of the sleeves 50 and 90 as well as at the inner face 72 of the filter chamber outer casing 71.

At the baffle plate 80, the gas flow is strongly decelerated such that the hot solids contained in the gas flow are thrown onto the baffle plate 80 and remain there as a material accumulation.

Through the filter chamber openings 73, the gas purified and, resp., filtered in this way arrives at the environment of the gas generator 10, i.e. especially in an airbag to be filled.

In other words, the idea of the invention is, inter alia, that the gas flow and, resp., gas flow lines in the filter chamber 70 have a crossing number of k>=3 with respect to the central longitudinal axis A of the gas generator 10. Here, in general the crossing number k of a curve (here the path of the gas flow) with respect to a straight line (here the central longitudinal axis A of the gas generator 10) represents the total number of the 90° intersections of the curve tangent(s) with the straight line.

Figure 2A:
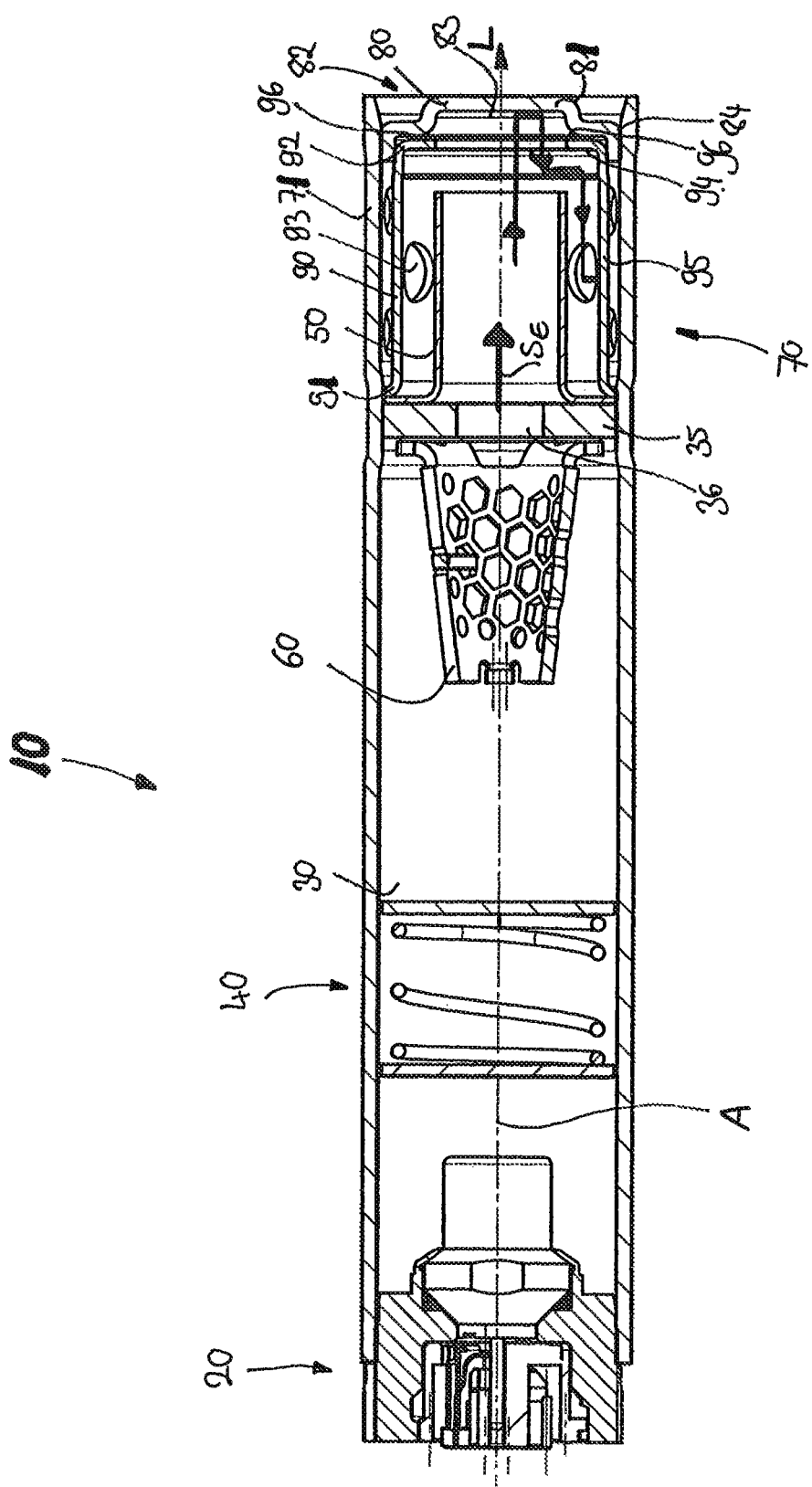
FIG. 2a shows a longitudinal sectional view across a gas generator according to the invention as set forth in a second embodiment.

In FIG. 2a, a gas generator 10 comparable to the gas generator 10 of FIG. 1 in terms of the basic structure is shown. Hereinafter, merely the differences regarding the filter chamber 70 are illustrated in detail.

In FIG. 2a, also a filter chamber 70 having two nested and substantially concentrically arranged sleeves 50 and 90 is shown. The design of the guiding sleeve 50 corresponds to the guiding sleeve 50 of FIG. 1. The second sleeve 90 rests on the guiding sleeve 50 at the combustion chamber-side end 91. The front face 92, on the other hand, has an annular portion 94. The annular portion 94 projects from the sleeve wall 95 at substantially 90°. The annular portion 94 points toward the central longitudinal axis A of the gas generator 10.

In FIG. 2a, the baffle plate 80 is in the form of a bottom element 81 of a cup-shaped front element 82. The wall 84 of the front element 82 encompasses the front face 92, especially the annular portion 94, of the second sleeve 90 so that the cup-shaped front element 82 is sufficiently secured. In addition, the baffle plate 80 has a recess 83. Due to said recess 83, the process of material depositions (solid and, resp., slag particles) of the gas flow can be intensified. By reason of the annular portion 94, there is moreover formed an undercut 96 in which further solid particles or slag particles can be deposited.

Figure 2B:
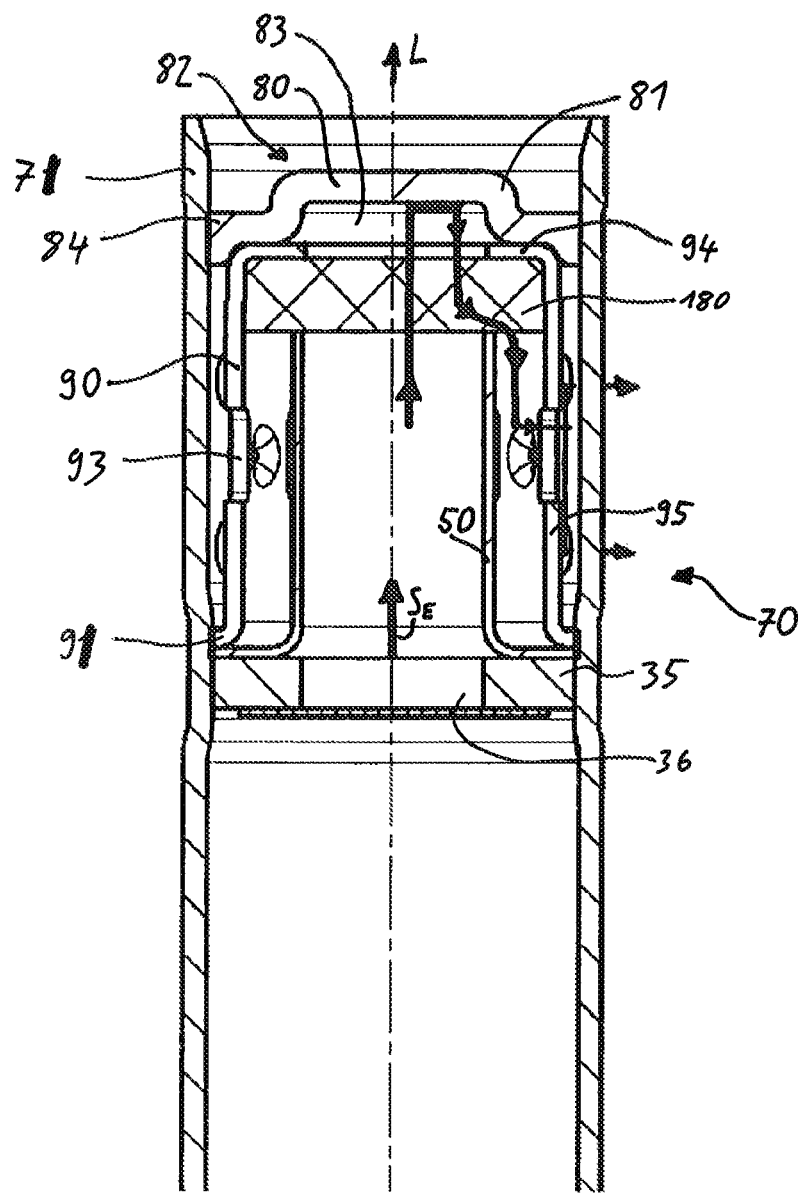
FIG. 2b is an embodiment of a filter chamber according to the principle of the gas generator according to the invention as set forth in FIG. 2a with an additional filter.

In FIG. 2b, an embodiment of a filter chamber in accordance with the principle of the gas generator according to the invention as set forth in FIG. 2a is shown, with the essential difference that, according to the design of FIG. 2b, an additional filter 180 is present inside the filter chamber 70. The filter 180 is positioned between the baffle plate 80 and the guiding sleeve 50 so that it is arranged substantially orthogonally to the inflow direction $S_E$ of the gas which may flow through the opening 36 in the combustion chamber bottom 35 into the filter chamber 70. As illustrated in FIG. 2b by the arrow lines, the filter 180 thus is so-to-speak in the way of the flow direction and, resp., the main flow direction of the gas, after the gas flowing through the guiding sleeve 50 has reached the axial end of the guiding sleeve 50 facing the baffle plate 80. The gas flow of the gas is not deflected by the filter 180, however, but propagates through the filter with a substantially unchanged direction of flow until it impinges on the baffle plate 80 and is deflected there, as shown according to the principle in FIG. 2a. Thus, also the design according to FIG. 2b equally operates according to the principle that the baffle plate 80 causes a reversal of the flow direction of the gas substantially about 180° relative to the inflow direction $S_E$. After said deflection of the gas flow on the baffle plate 80, the gas flow can be guided, equally through the filter 180 again in the direction of the filter chamber outer casing 71 according to the principle as also shown in FIG. 2a.

Consequently, the filter 180 is no obstacle to the gas flow which would completely block or substantially deflect the latter, but merely causes for the gas a certain distance for flowing through the filter 180, wherein the gas can be subjected to additional cooling and/or particle filtering in this case. The filter 180 is made from metal and is a wire cloth or wire mesh and is preferably adapted, as shown in FIG. 2b, to the inner contour of the annular portion 94 of the second sleeve 90 and is inserted or pressed into the bottom area or into the area of the annular portion 94 of the second sleeve 90. For axially positioning the filter 180 in the direction of the combustion chamber bottom 35, the filter 180 rests against the opening of the guiding sleeve 50 facing the filter.

When expressed in a simplified manner, the design according to FIG. 2b substantially constitutes the same design according to FIG. 2a, but with the additional filter 180 by which a certain optimized residual filtering or residual cooling can be effectuated in addition to the filtering and, resp., cooling by the system comprising the guiding sleeve 50, the baffle plate 80 with the deflecting effect for the gas flow.

Figure 3:
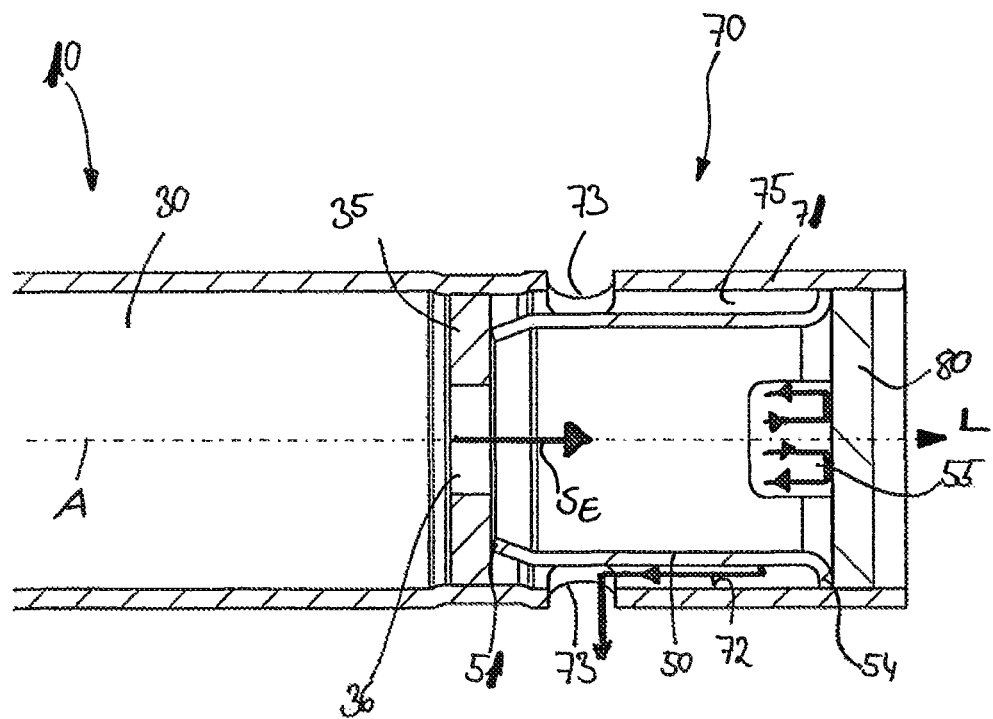
FIGS. 3 and 4 show different embodiments regarding a filter chamber having merely one single guiding sleeve.

FIG. 3 illustrates another embodiment of a filter chamber 70. There merely one single guiding sleeve 50 is provided. The guiding sleeve 50 again rests on the combustion chamber bottom 35 at the combustion chamber-side end 51. At the second end 53 of the guiding sleeve 50 an annular portion 54 is formed. In the shown cross-section, the guiding sleeve 50 is substantially tulip-shaped. Due to the annular portion 54, fastening, especially clamping, of the guiding sleeve 50 can be effectuated in the filter chamber 70 especially within the filter chamber outer casing 71.

The shown baffle plate 80 again effectuates a reversal of the flow direction of the gas substantially about 180° with respect to the inflow direction $S_E$. In the shown example, the further deflection section is a guiding sleeve opening 55 formed in the guiding sleeve 50. The guiding sleeve opening 55 has a substantially rectangular cross-section. The guiding sleeve opening 55 is formed substantially in the last third of the guiding sleeve 50, i.e. in the third of the guiding sleeve 50 facing the baffle plate 80. Accordingly, despite the formation of the guiding sleeve opening 55, the majority of the gas flow arrives at the baffle plate 80 and is deflected there with respect to the flow direction.

A possible formation of partial gas flows that might flow off at the beginning of the guiding sleeve 50, viz. in the area of the combustion chamber-side end 51 thereof, is advantageously inhibited by the shown configuration of the guiding sleeve 50. Between the guiding sleeve 50 and the filter chamber outer casing 71, especially the inner face 72 of the filter chamber outer casing 71, the first discharge chamber 75 is formed. The gas flowing out of the guiding sleeve 50 thus flows at first in the direction of the combustion chamber 30 in order to subsequently reach the environment via the filter chamber openings 73.

Figure 4:
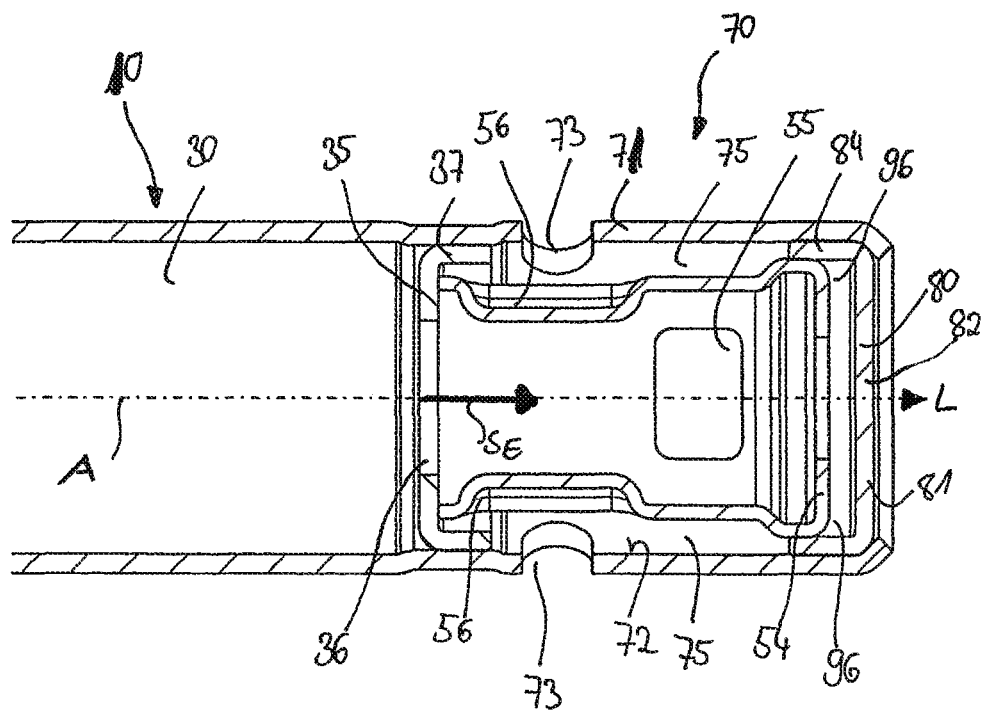

In FIG. 4, too, a filter chamber 70 merely comprising one single sleeve, i.e. the guiding sleeve 50, is shown. Equally shown is an alternative embodiment of a combustion chamber bottom 35. The combustion chamber bottom 35 has a sleeve nozzle 37 pointing in the direction of the filter chamber 70. The combustion chamber-side end 51 of the guiding sleeve 50 again rests on the combustion chamber bottom 35. At the second end 53 of the guiding sleeve 50, again an annular portion 54 is formed, wherein the latter points in the direction of the central longitudinal axis A of the gas generator 10.

The baffle plate 80 again is in the form of a bottom element 81 of a cup-shaped front element 82. Between the annular portion 54 of the guiding sleeve 50 and the wall 84 of the front element 82, again an undercut 96 is formed in which particles of the gas flow can be deposited. After appropriately reversing the flow direction of the gas, starting from the baffle plate 80 the gas flows through the guiding sleeve openings 55 into the first discharge chamber 75. The discharge chamber 75 is formed between the inner face 72 of the filter chamber outer casing 71 and the guiding sleeve 50.

In the guiding sleeve 50, axially extending recesses 56 are formed. The axially extending recesses 56 extend in parallel to the central longitudinal axis A of the gas generator 10. Preferably, plural axial recesses 56 of this kind are formed. Said recesses 56 serve for detecting the position of the mounted guiding sleeve 50. Said recesses 56 are evident by viewing through the filter chamber openings 73, for example by an appropriate optical system when manufacturing the gas generator 10, which optical system helps determine the correct position of the guiding sleeve 50 by means of the orientation of the axial recesses 56. In this case, the filter chamber openings 73 are preferably in the form of oblong holes. Preferably, at least two oblong holes are formed to achieve shear neutrality of the gas generator 10.

Figure 5A:
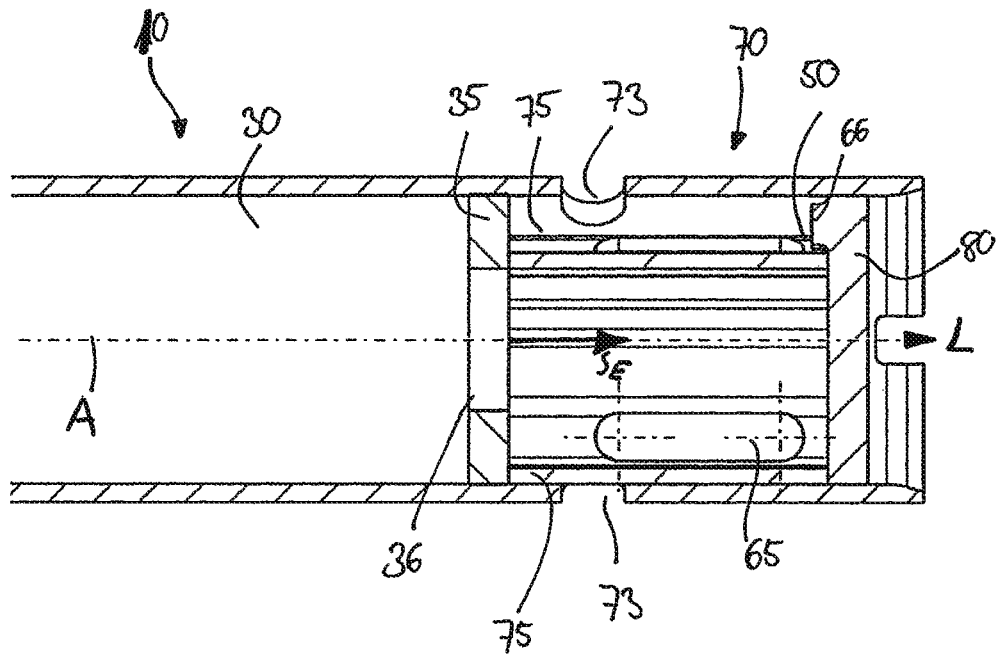
FIGS. 5a and 5b show a longitudinal section as well as a cross-sectional view of another embodiment of a filter chamber.
Figure 5B:
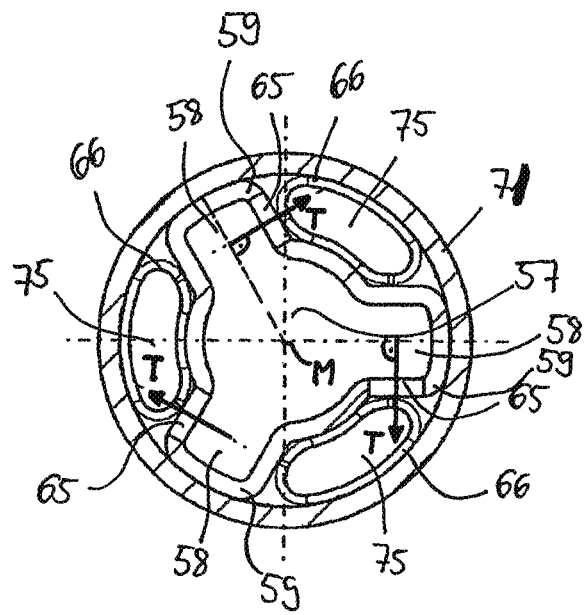

In FIGS. 5a and 5b, the filter chamber 70 is configured in the form of a radial labyrinth. It is evident that again merely one single guiding sleeve 50 is formed. The cross-section of the guiding sleeve 50 is visible in FIG. 5b. Accordingly, the guiding sleeve 50 has a central portion 57 of circular cross-section which has a center M, with bulges 58 enlarging the cross-section being further evident. The bulges 58 have a substantially rectangular, especially a substantially square, cross-section. In each bulge wall 59 of each bulge 58 an oblong hole 65 is formed which is substantially in parallel to the central longitudinal axis A of the gas generator 10.

Between each of the bulges 58 a first discharge chamber 75 is formed. Thus, the discharge chamber 75 is subdivided into plural portions separated from each other by the bulges 58.

When the inflowing gas has been deflected at the baffle plate about 180°, the gas arrives through the oblong holes 65 of the bulge walls 59 into each of the separated first discharge chambers 75 in which the gas may expand. Then the gas may flow out of the first discharge chamber 75 through the filter chamber openings 73 to the outside. In detail, the afore-mentioned path and, resp., the deflection of the gas or gas flow extends as follows. At first the gas flows in the inflow direction $S_E$, viz. in the axial longitudinal direction L of the gas generator 10, into the filter chamber 70 to flow through the latter along its substantially total length up to the baffle plate 80. There, a reversal of direction of the gas flow takes place, against the inflow direction $S_E$, the gas flow being initially guided inside the guiding sleeve 50 up to the oblong holes 65 through which the gas flow then can arrive at an outer side of the guiding sleeve 50, viz. into the first discharge chamber 75. In the latter portion of the gas flow through the oblong holes 65, the gas flow is guided or flows in portions in a tangentially directed way, which is indicated in FIG. 5b by respective arrow symbols illustrating said tangential gas flow T. Geometrically, said tangentially directed gas flow, relating to the cross-sectional plate of FIG. 5b, can be described as follows.

Associating the center M of the central portion 57 with the middle of a bulge 58 in the radial direction by an imaginary line (shown by a broken line in FIG. 5b) and dropping a perpendicular from said imaginary line in the direction of the nearest oblong hole 65 or, resp., through said oblong hole 65, said perpendicular results in the tangential gas flow T and, resp., the direction thereof.

In other words, in the area of the tangential gas flow T, in addition to the previously described axial and radial gas deflecting distances, also a tangentially directed component will occur which in this area can also be understood to be a gas flow extending substantially in parallel to the periphery of the gas generator 10 and, resp., extending tangentially to the periphery of the filter chamber 71. Altogether, a three-dimensional deflection of the gas flow comprising axial, radial as well as tangential directional components can thus be obtained.

In FIG. 5b, moreover kidney-shaped anti-twist protection elements 66 are visible. They are configured between the bulges 58 and prevent the guiding sleeve 50 from twisting. The anti-twist protection elements 66 are formed on the baffle plate 80. In particular, the anti-twist protection elements 66 and the baffle plate 80 are designed in one piece.

Figure 6:
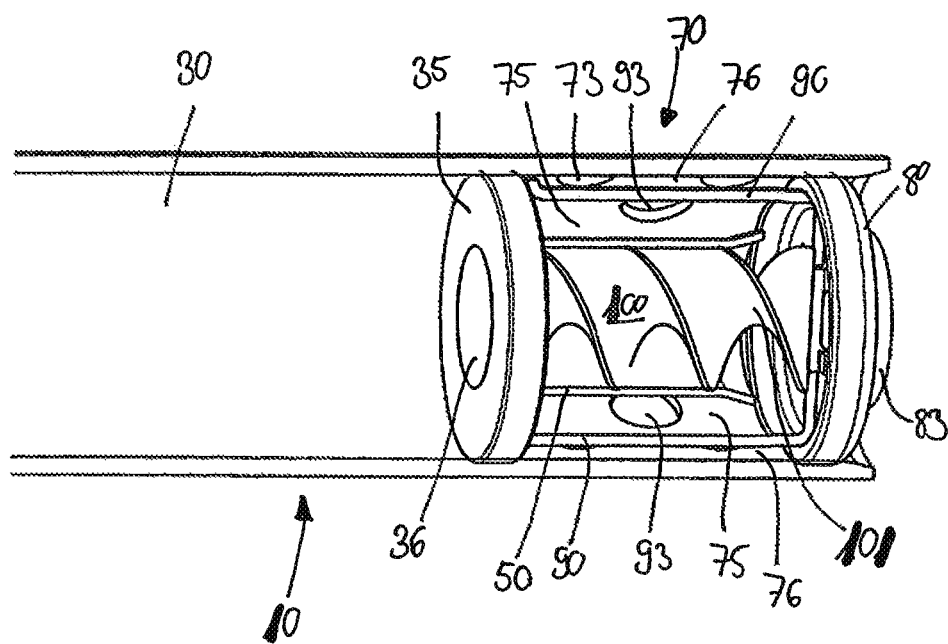
FIG. 6 shows a view of a swirl vane.

FIG. 6 illustrates a partial area of a gas generator 10 again comprising a filter chamber 70 having two sleeves, i.e. the guiding sleeve 50 and the second sleeve 90. In addition, this embodiment has a helical swirl vane 100. The latter extends from the combustion chamber opening or combustion chamber outlet 36 and, resp., from the combustion chamber bottom 35 to the baffle plate 80. The gas flow here is guided over the surface 101 of the swirl vane 100. In other words, the gas flow moves helically in the direction of the baffle plate 80. In this way, particles of the gas flow can be better separated.

The swirl vane 100 acts quasi like a centrifugal separator. Simultaneously the gas is cooled. The velocity of the gas flow is not strongly decelerated here, however. Thus, the particles are separated both at the inner face of the guiding sleeve 50 and at the baffle plate 80. The further design of the filter chamber 70 substantially corresponds to the embodiments of FIGS. 1 and 2.

The swirl vane 100 is intended to include a sufficiently large number of turns, with the number of the turns (number of turns w) preferably having a minimum value of 3.

In general, the number of turns w of a curve relative to a point z constitutes the number of the anti-clockwise revolutions about the point z when following the path of the curve. A clockwise revolution results in a negative number of turns, an anti-clockwise revolution results in a positive number of turns. In order to obtain favorable particle separation in a filter chamber 70, as depicted in FIG. 6, therefore the amount of the number of turns w should have at least the value 3.

The swirl vane 100 as described for FIG. 6 may be positioned inside the guiding sleeve 50 shown there even in the embodiments of the gas generator 10, as illustrated in FIG. 1 to 5 or 8, and may additionally bring its aforedescribed effect (centrifugal separator).

Figure 7A:
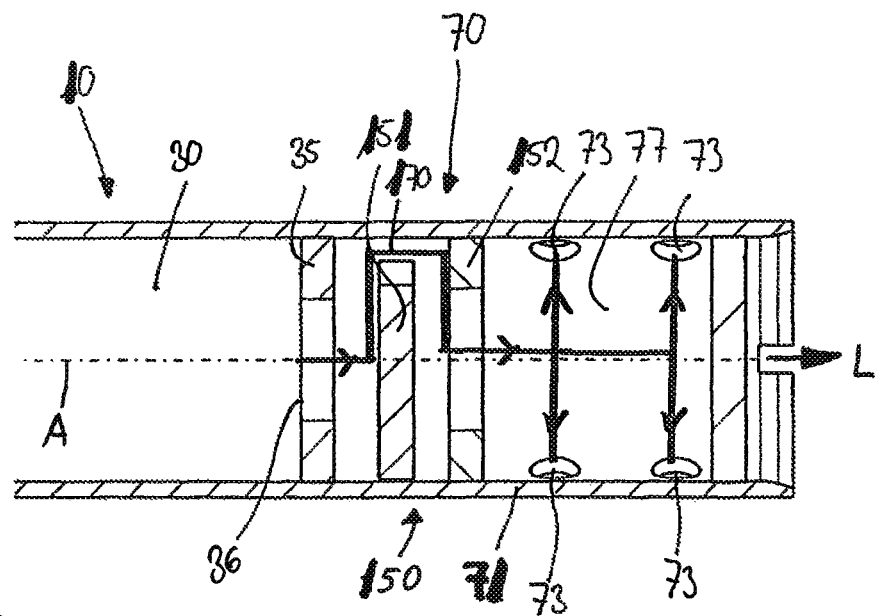
FIGS. 7a and 7b show different sectional views of a gas generator having a plate labyrinth filter system.

FIG. 7 represents another embodiment of a gas generator 10 according to the invention. The combustion chamber outlet 36 is in the form of a central opening of the combustion chamber bottom 35. In the filter chamber 70 a plate labyrinth filter system 150 is located. The latter comprises at least two plates positioned successively in the longitudinal axis, viz. a first plate 151 and a second plate 152. The plates 151 and 152 extend perpendicularly to the axial longitudinal direction L of the gas generator 10. Gas flowing into the filter chamber 70 at first impacts on the first plate 151.

Figure 7B:
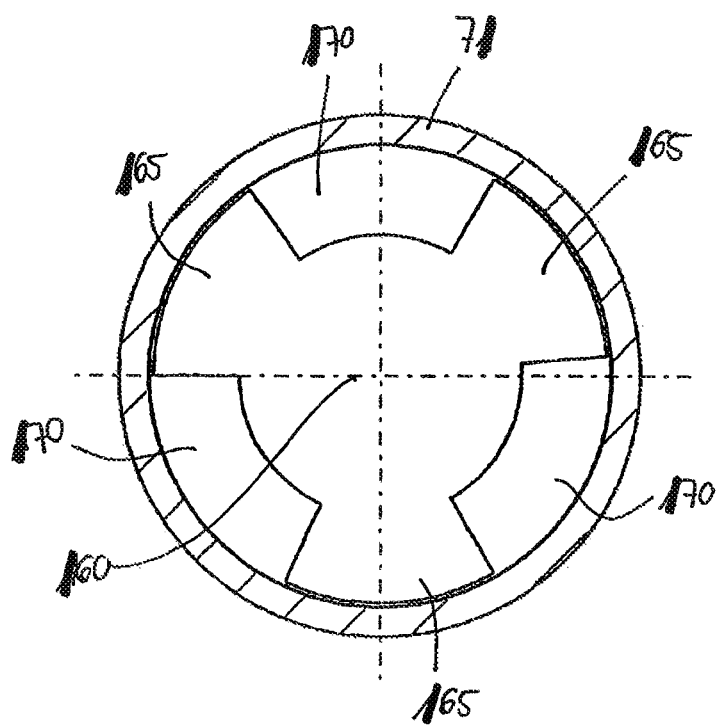

FIG. 7b illustrates the shape of said first plate 151 in greater detail. Thus, the plate 151 has a circular portion 160 including circular segment portions 165 laterally projecting therefrom. Between the circular segment portions 165 flow passages 170 are formed. The number of the circular segment portions 165 corresponds to the number of flow passages 170 formed. The cross-section of the combustion chamber outlet 36 of the combustion chamber bottom 35 is smaller than the diameter of the circular portion 160. Thus, gas flowing into the filter chamber 70 first impacts on the circular portion 160 of the first plate 151 and then flows through the flow passages 170 in the direction of the second plate 152.

The second plate 152 is substantially ring-shaped. The inner diameter of said ring shape is smaller than the diameter of the circular portion 160, or in other words, the cross-section of the ring surface of the second plate 152 covers the surfaces of the flow passages 170 projected thereto in the axial direction so that the gas guided through the flow passages 170 is deflected by the annular portion of the second plate 152 in the direction of the central longitudinal axis A of the gas generator 10. Subsequently, the gas arrives in the chamber section 77 so that it can flow there through the filter chamber openings 73 to the outside.

Figure 8:
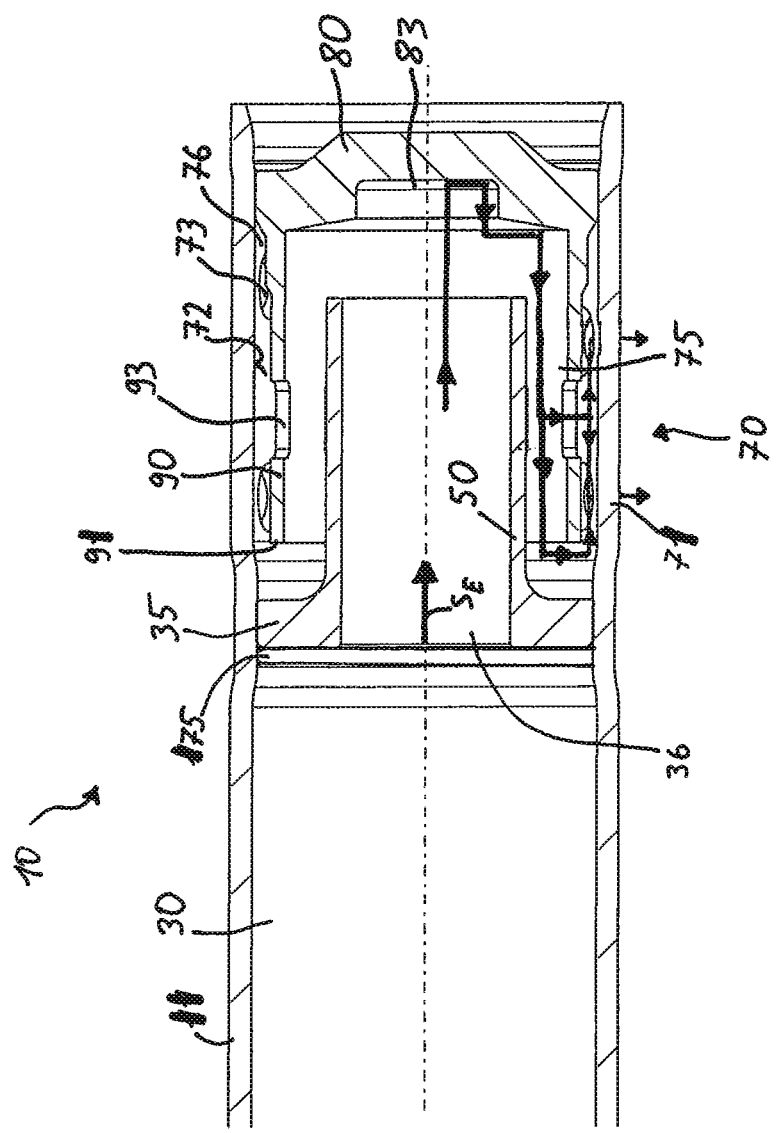
FIG. 8 shows a longitudinal sectional view across a subarea of a gas generator according to the invention as set forth in another embodiment.

FIG. 8 illustrates a portion of a gas generator 10 which is comparable as to its basic structure to the gas generator 10 of FIG. 2a. Hereinafter, merely the substantial differences regarding the filter chamber 70 will be described in detail.

In FIG. 8, too, a filter chamber 70 having two sleeves 50 and 90 positioned inside each other and arranged substantially concentrically is shown. However, in this case the guiding sleeve 50 is formed with the combustion chamber bottom 35 as a joint one-piece component. Equally, also the second sleeve 90 is formed with the baffle plate 80 as a joint one-piece component. In other words, here the combustion chamber bottom 35 which is substantially a disk having a central through-opening, viz. the combustion chamber outlet 36, merges integrally into the guiding sleeve 50 which can be understood to be a hollow-cylindrical axial extension of the combustion chamber outlet 36. The combustion chamber bottom 35 thus is so-to-speak "melted" with the guiding sleeve 50 and, in this way, a new one-piece component "combustion chamber bottom 35 plus guiding sleeve 50" is formed. Here, too, the combustion chamber outlet 36 can be closed by a tamping 175 in the idle state of the gas generator 10.

Analogously to that, FIG. 8 also shows that equally the baffle plate 80 may merge integrally into the second sleeve 90, with a cup-shaped new one-piece component being formed which is to be understood as "baffle plate 80 plus second sleeve 90". In this case, too, analogously to FIG. 2a, a recess 83 serving as slag trap for depositing particles from the gas flow upon activation of the gas generator 10 may be configured in the baffle plate 80.

The afore-described respective one-piece design of "combustion chamber bottom 35 plus guiding sleeve 50" and "baffle plate 80 plus second sleeve 90" help to save, as evident from FIG. 8, a total maximum of two single components, as compared to the design of FIG. 2a.

Of course, it is also imaginable that only one of said two described one-piece components of FIG. 8 is realized. In such case, only the "combustion chamber bottom 35 plus guiding sleeve 50" or the "baffle plate 80 plus second sleeve 90" is thus provided as a one-piece component, wherein the respective other components are configured as respective single components, analogously to FIG. 2a.

In FIG. 8, the path of the gas flow and the deflection thereof are inserted by way of example equally in the form of lines with arrows and basically correspond to the path of the gas flow as shown in FIG. 2a. However, the following noteworthy difference and, resp., a special feature is resulting here.

As is evident from FIG. 8, the combustion chamber-side end 91 of the second sleeve 90 does not contact the combustion chamber bottom 35 or the guiding sleeve 50 and, resp., does not abut on said components. It is rather evident that a clear distance of the combustion chamber-side end 91 of the second sleeve 90 is given in the axial direction from the combustion chamber bottom 35 and in the radial direction from the guiding sleeve 50. Thus, also in this case a gas flow around the combustion chamber-side end 91 of the second sleeve 90 is possible by the gas flow, when provided already in the first discharge chamber 75, against the inflow direction $S_E$, being guided into a deflecting zone in the area of the combustion chamber-side end 91 of the second sleeve 90 and being deflected there substantially about 180° into the second discharge chamber.

Accordingly, in a constructional design as shown in FIG. 8, the illustrated sleeve opening 93 in the second sleeve 90 may be optional. In other words, the gas flow need not absolutely extend additionally through a sleeve opening 93, but may extend, in the case of absent sleeve openings, merely around the combustion chamber-side end 91 of the second sleeve 90, as afore-described.

Concerning FIGS. 3 to 8, it is further noted that there also a combustion chamber screen 60 in the form of a cone or a hollow frustum having plural combustion chamber screen holes in the axial and radial directions may be provided inside the combustion chamber 30, especially at a position as illustrated in FIGS. 1 and 2, viz. in direct vicinity of the combustion chamber bottom 35.

LIST OF REFERENCE NUMERALS 10 gas generator
11 outer casing
15 inner face
20 ignition unit
21 igniter
30 combustion chamber
31 solid propellant bed
32 ignition mixture
33 first section of combustion chamber
34 second section of combustion chamber
35 combustion chamber bottom
36 combustion chamber outlet/opening
37 sleeve nozzle
40 filler element
41 spring
42, 43 front-side terminal element
50 guiding sleeve
51 combustion chamber-side end
52 fastening flange
53 second end
54 annular portion
55 guiding sleeve opening
56 axial recess
57 central portion
58 bulge
59 bulge wall
60 combustion chamber screen
61 combustion chamber screen holes
65 oblong hole
66 anti-twist protection element
70 filter chamber
71 filter chamber outer casing
72 inner face
73 filter chamber opening
75 first discharge chamber
76 second discharge chamber
77 chamber section
80 baffle plate
81 bottom element
82 cup-shaped front element
83 recess
84 wall
90 second sleeve
91 combustion chamber-side end
92 front face
93 sleeve opening
94 ring portion
95 sleeve wall
96 undercut
100 helical swirl vane
101 surface of swirl vane
150 plate labyrinth filter system
151 first plate
152 second plate
160 circular portion
165 circular segment portion
170 flow passage
175 tamping
180 filter
L axial longitudinal direction of gas generator
A central longitudinal axis of gas generator
M center
$S_E$ inflow direction
T tangential gas flow

The invention claimed is:

1. A pyrotechnical tube gas generator (10) with an axial longitudinal direction (L), comprising an ignition unit (20), a combustion chamber (30) mounted axially downstream of the ignition unit (20) comprising a combustion chamber bottom (35), and a filter chamber (70) that is mounted axially downstream of the combustion chamber (30), wherein in the filter chamber (70) a plate labyrinth filter system (150) is formed, the plate labyrinth filter system (150) including at least two plates (151, 152) positioned axially downstream of each other, wherein the at least two plates (151, 152) are aligned substantially perpendicularly to the axial longitudinal direction (L) of the gas generator (10) and substantially in parallel to the combustion chamber bottom (35), and wherein each of the at least two plates (151, 152) has at least one through-opening, the through-openings of adjacent ones of the at least two plates (151, 152) being arranged to be offset against each other in the radial direction, wherein the combustion chamber bottom (35) comprises a combustion chamber outlet (36) comprising at least one opening in the combustion chamber bottom (35), wherein all of the through-openings of a first plate (151) of the plate labyrinth filter system (150) arranged to be first in the axial longitudinal direction (L) being formed between the first plate (151) and an inner face (72) of a filter chamber outer casing (71).

2. The gas generator (10) according to claim 1, wherein the first plate (151) of the at least two plates of the plate labyrinth filter system (150) has a circular portion (160) with circular segment portions (165) projecting laterally therefrom.

3. The gas generator (10) according to claim 2, wherein the first plate includes a plurality of through-openings formed between the first plate (151) and the inner face (72) of the filter chamber outer casing (71), all of the through-openings of the first plate (151) being formed between the circular segment portions (165) of the first plate (151) and displaced radially outwardly in relation to the combustion chamber outlet (36).

4. The generator (10) according to claim 2, wherein the number of circular segment portions (165) equals the number of through-openings of the first plate (151).

5. The gas generator (10) according to claim 2, wherein the cross-section of the combustion chamber outlet (36) of the combustion chamber bottom (35) is smaller than the diameter of the circular portion (160) so that gas flowing into the filter chamber (70) through the combustion chamber outlet (36) first impacts on the circular portion (160) of the first plate (151) and then flows toward the through-openings of the first plate (151).

6. The gas generator (10) according to claim 2, wherein a second plate (152) of the plate labyrinth filter system (150) is ring-shaped with only one through-opening, the one through-opening of the second plate (152) being arranged centrally on the second plate (152), a diameter of the central through-opening of the second plate (152) being smaller than a diameter of the circular portion (160) of the first plate (151).

7. The gas generator (10) according to claim 1, wherein in the combustion chamber (30) a combustion chamber screen (60) is arranged which is mounted axially upstream, with respect to the longitudinal direction (L) of the gas generator, of the filter chamber (70), the combustion chamber screen (60) being in the form of a sleeve having radial openings (61).

8. The gas generator (10) according to claim 1, further comprising a helical vane arranged axially upstream of the labyrinth filter system (150).

9. An airbag module comprising a gas generator (10), an airbag inflatable by the gas generator (10) and a fastening device for attaching the airbag module to a vehicle, wherein the gas generator (10) is configured according to claim 1.

10. A vehicle safety system for protecting a person such as a vehicle occupant or a pedestrian, comprising a gas generator (10), an airbag inflatable by the gas generator (10) as part of an airbag module, and an electronic control unit by means of which the gas generator (10) can be activated when a trigger situation is given, wherein the gas generator (10) is configured according to claim 1.

11. The gas generator (10) according to claim 2, wherein the circular portion (160) is free from through-openings so that gas flowing into the filter chamber (70) through the combustion chamber outlet (36) first impacts on the circular portion (160) of the first plate (151) and then flows toward the through-openings of the first plate (151).

12. The gas generator (10) according to claim 1, wherein the first plate (151) has a central portion (160) intersecting a central longitudinal axis (A) of the gas generator (10), the central portion (160) being free from through-openings so that all of the through-openings of the first plate (151) are formed between the central portion (160) and the inner face (72) of the filter chamber outer casing (71).

13. The gas generator (10) according to claim 1, wherein a second plate (152) of the plate labyrinth filter system (150) arranged to be second in the axial longitudinal direction (L) is ring-shaped with only one through-opening, the one through-opening of the second plate (152) being arranged centrally on the second plate (152).

14. The gas generator (10) according to claim 13, wherein gas flowing into the filter chamber (70) through the combustion chamber outlet (36) first travels along a central longitudinal axis (A) of the gas generator (10), then travels parallel to, and radially spaced apart from, the central longitudinal axis (A) through the at least one through-opening of the first plate (151), and then travels along the central longitudinal axis (A) through the central through-opening of the second plate (152).

15. The gas generator (10) according to claim 13, wherein the first plate (151) has a central portion (160) that is free from through-openings, all of the through-openings of the first plate (151) being formed between the central portion (160) and the inner face (72) of the filter chamber outer casing (71), the central portion (160) of the first plate (151) having a larger diameter than a dimeter of the central through-opening of the second plate (152).

* * * * *